United States Patent
Kim et al.

(10) Patent No.: US 9,059,808 B2
(45) Date of Patent: Jun. 16, 2015

(54) MICROPROCESSOR CHIP, DATA CENTER, AND COMPUTING SYSTEM

(75) Inventors: Ho-jung Kim, Suwon-si (KR); Young-soo Park, Yongin-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 116 days.

(21) Appl. No.: 13/611,839

(22) Filed: Sep. 12, 2012

(65) Prior Publication Data

US 2013/0177323 A1 Jul. 11, 2013

(30) Foreign Application Priority Data

Jan. 11, 2012 (KR) .................. 10-2012-0003451

(51) Int. Cl.
H04B 10/00 (2013.01)
H04B 10/80 (2013.01)

(52) U.S. Cl.
CPC .................................. H04B 10/801 (2013.01)

(58) Field of Classification Search
CPC .... H04B 10/40; H04B 10/801; H04B 10/278; H04B 10/1143; H04B 10/2503; H04B 10/25756; H04Q 11/0005; H04Q 11/0001; H04J 14/028; H04L 12/40013
USPC .......................... 398/135–139, 164, 60, 73, 45
See application file for complete search history.

(56) References Cited

U.S. PATENT DOCUMENTS

| | | | |
|---|---|---|---|
| 5,187,605 A * | 2/1993 | Shikata et al. | 398/99 |
| 7,112,780 B2 * | 9/2006 | Mechler | 250/227.11 |
| 7,336,900 B2 * | 2/2008 | DeCusatis et al. | 398/45 |
| 8,234,416 B2 * | 7/2012 | Lai | 710/16 |
| 8,693,865 B2 * | 4/2014 | Aguren | 398/21 |
| 2001/0031109 A1 | 10/2001 | Paniccia et al. | |
| 2002/0035640 A1 * | 3/2002 | Greenberg et al. | 709/238 |
| 2004/0217170 A1 * | 11/2004 | Takiguchi et al. | 235/449 |
| 2005/0078902 A1 | 4/2005 | Beausoleil et al. | |
| 2005/0100340 A1 * | 5/2005 | Nishimura | 398/135 |
| 2005/0276604 A1 * | 12/2005 | Morrow et al. | 398/73 |
| 2006/0093361 A1 * | 5/2006 | Fenwick et al. | 398/73 |
| 2007/0118630 A1 | 5/2007 | Hashimoto et al. | |
| 2007/0286602 A1 * | 12/2007 | DeCusatis et al. | 398/45 |
| 2007/0297797 A1 * | 12/2007 | DeCusatis et al. | 398/45 |
| 2010/0290388 A1 | 11/2010 | Srivastava | |

(Continued)

FOREIGN PATENT DOCUMENTS

| | | |
|---|---|---|
| JP | 2011-013711 A | 1/2011 |
| KR | 2010-0131962 A | 12/2010 |

(Continued)

OTHER PUBLICATIONS

Extended search report for corresponding European patent application No. 12185286.7 dated Apr. 18, 2013.

(Continued)

Primary Examiner — Daniel Washburn
Assistant Examiner — Hibret Woldekidan
(74) Attorney, Agent, or Firm — Harness, Dickey & Pierce, P.L.C.

(57) ABSTRACT

A microprocessor chip includes a plurality of processors; at least one first optical input/output unit configured to receive optical signals from an external device and transmit optical signals to the external device; and an optical system bus that is connected between the plurality of processors and the at least one first optical input/output unit.

14 Claims, 6 Drawing Sheets

(56) References Cited

U.S. PATENT DOCUMENTS

| | | | |
|---|---|---|---|
| 2012/0033978 A1* | 2/2012 | Morris et al. | 398/115 |
| 2013/0148962 A1* | 6/2013 | Heimbuch | 398/38 |
| 2014/0023365 A1* | 1/2014 | Xi | 398/58 |
| 2014/0241718 A1* | 8/2014 | Jiang | 398/48 |

FOREIGN PATENT DOCUMENTS

| | | |
|---|---|---|
| KR | 2011-0051028 A | 5/2011 |
| KR | 20110053537 A | 5/2011 |
| KR | 2011-0069254 A | 6/2011 |
| KR | 201100061342 A | 6/2011 |

OTHER PUBLICATIONS

Michael Georgas et al., "A monolithically-integrated optical receiver in standard 45-nm SOI," ESSCIRC (ESSCIRC), The 2011 Proceedings of IEEE, Sep. 12, 2011, pp. 407-410.

Xiaowen Wu et al, "UNION: A unified inter/intra-chip optical network for chip multiprocessors," Nanoscale Architectures (NANOARCH), 2010 IEEE/ACM International Symposium on, Piscataway, NJ, USA, Jun. 17, 2010, pp. 35-40.

Nevin K. Rman et al., "On-Chip Optical Technology in Future Bus-Based Multicore Designs," IEEE Micro, IEEE Service Center, Los Alamitos, CA, US, vol. 27, No. 1, Jan. 2007-Feb. 2007, pp. 56-66.

Batten et al., "Building Manycore Processor-to-DRAM Networks with Monolithic Silicon Photonics," Aug. 2008.

* cited by examiner

MICROPROCESSOR CHIP, DATA CENTER, AND COMPUTING SYSTEM

CROSS-REFERENCE TO RELATED APPLICATIONS

This application claims the benefit of Korean Patent Application No. 10-2012-0003451, filed on Jan. 11, 2012, in the Korean Intellectual Property Office (KIPO), the disclosure of which is incorporated herein in its entirety by reference.

BACKGROUND

1. Field

The present disclosure relates to microprocessor chips, data centers, and computing systems, and more particularly, to a microprocessor chip using optical communication, a data center including the microprocessor chip, and a computing system including the data center.

2. Description of the Related Art

Recently, cloud computing systems based on virtual technology have become widely used. The cloud computing systems are distributed computing systems in which a plurality of computers are connected with each other to operate as a single computer and provide an independent virtual machine to a plurality of users with the same hardware platform.

SUMMARY

Provided are microprocessor chips having improved response speed and improved bandwidth.

Provided are data centers including the microprocessor chip.

Provided are computing systems including the data center.

Additional aspects will be set forth in part in the description which follows and, in part, will be apparent from the description, or may be learned by practice of the presented embodiments.

According to at least one example embodiment, a microprocessor chip for performing optical communication with at least one external device includes: a plurality of processors; at least one first optical input/output unit configured to receive optical signals from the at least one external device and transmit optical signals to the at least one external device; and an optical system bus that is connected between the plurality of processors and the at least one first optical input/output unit.

The optical system bus may include an internal bus that is used to connect between the plurality of processors or connect the plurality of processors and a register.

The optical system bus may include multi-channel optical wave guides.

The optical signals received from the at least one external device by the at least one first optical input/output unit may be directly transmitted to the plurality of processors.

Each of the plurality of processors may output optical signals, and the optical signals may be directly transmitted to the at least one external device through the optical system bus and the at least one first optical input/output unit.

Each of the plurality of processors may include: an optical detector that is connected with the optical system bus and configured to receive optical signals from the at least one external device; and an optical source that is connected with the optical system bus and configured to transmit optical signals to the at least one external device.

The at least one first optical input/output unit may include at least one first optical connector that is exposed to the outside of the microprocessor chip and configured to connect with a second optical input/output unit of the at least one external device.

The at least one first optical input/output unit may include at least one first optical switch that is connected between the at least one first optical connector and the optical system bus.

The microprocessor chip may further include a first optical bus arbiter that is configured to control transmission of an optical signal on the optical system bus.

The microprocessor chip may further include at least one third optical input/output unit that is formed in the microprocessor chip and is configured to receive optical signals from a terminal or transmit optical signals to the terminal.

Each of the plurality of processors may output optical signals, the optical signals output from each of the plurality of processors may be directly transmitted to the terminal through the optical system bus and the at least one third optical input/output unit, and optical signals received from the terminal by the at least one third optical input/output unit may be directly transmitted to the plurality of processors through the optical system bus.

According to at least one example embodiment, a microprocessor chip for performing optical communication with at least one external device includes: a first processor including a first optical transceiver; a second processor including a second optical transceiver; at least one first optical input/output unit configured to receive optical signals from the at least one external device and transmit optical signals to the at least one external device; and an optical system bus that is connected between the first and second transceivers and the at least one first optical input/output unit.

The microprocessor chip may further include a first optical bus arbiter that is configured to control transmission of an optical signal on the optical system bus.

The first optical bus arbiter may be configured to determine the order of priority of operation between the first optical transceiver and the second optical transceiver.

The at least one first optical input/output unit may include: at least one first optical connector that is exposed to the outside of the microprocessor chip and is configured to connect with a second optical input/output unit of the at least one external device; and at least one first optical switch that is connected between the at least one first optical connector and the optical system bus.

The first optical bus arbiter may be configured to control the first optical transceiver, the second optical transceiver, and the at least one first optical switch to determine connection relation between the first and second transceivers and the at least one first optical connector.

The first optical bus arbiter may be configured to control the first optical transceiver, the second optical transceiver, and the at least one first optical switch so that parallel communication using a plurality of wavelengths is performed when at least one from among the first optical transceiver and the second optical transceiver uses the plurality of wavelengths.

According to at least one example embodiment, a data center includes: a microprocessor chip having a first processing speed; and at least one first external device having a second processing speed that is slower than the first processing speed, wherein the microprocessor chip includes: a plurality of processors; at least one first optical input/output unit configured to receive optical signals from the at least one external device and transmit optical signals to the at least one external device; and an optical system bus that is connected between the plurality of processors and the at least one first optical input/output unit.

The at least one external device may include at least one from among a memory device and a storage device.

Optical signals that are processed in the microprocessor chip may be transmitted to the at least one external device without being changed into signals having a different form from the optical signals.

The at least one external device may include at least one second optical input/output unit that is configured to receive optical signals from the at least one first optical input/output unit or transmit optical signals to the at least one first optical input/output unit.

The at least one second optical input/output unit may include at least one second optical connector that is exposed to the outside of the at least one external device and is configured to connect with the at least one first optical input/output unit of the microprocessor chip.

The at least one external device may include at least one fourth optical input/output unit that is configured to receive optical signals from another external device or transmit optical signals to the another external device.

The at least one fourth optical input/output unit may include at least one fourth optical connector that is exposed to the outside of the at least one external device and is configured to connect with an optical input/output unit of the another external device.

The at least one external device further include a second optical bus arbiter that is configured to control transmission of optical signals between the at least one external device and the microprocessor chip and transmission of optical signals between the at least one external device and the another external device.

According to at least one example embodiment, a computing system includes: the data center stated above; and at least one terminal that is configured to operate through optical communication with the data center.

Optical signals that are processed in the microprocessor chip of the data center may be transmitted to the at least one terminal without being changed into signals having a different form from the optical signals.

The at least one terminal may include a first terminal and a second terminal, the first terminal is controlled by a first processor of the microprocessor chip, and the second terminal is controlled by a second processor of the microprocessor chip.

The microprocessor chip may further include at least one third optical input/output unit that is configured to receive optical signals from the at least one terminal or transmit optical signals to the at least one terminal.

The at least one third optical input/output unit may include at least one third optical connector that is exposed to the outside of the microprocessor chip and is configured to connect with an optical input/output unit of the at least one terminal.

The optical signals that are processed in the microprocessor chip of the data center may be transmitted to the at least one terminal through the at least one external device without being changed into signals having a different form from the optical signals.

The at least one external device may include at least one fifth optical input/output unit that is configured to receive optical signals from the at least one terminal or transmit optical signals to the at least one terminal.

The at least one fifth optical input/output unit may include at least one fifth optical connector that is exposed to the outside of the at least one external device and is configured to connect with an optical input/output unit of the at least one terminal.

The at least one external device may further include a third optical bus arbiter that is configured to control transmission of optical signals between the at least one external device and the microprocessor chip and transmission of optical signals between the at least one external device and the at least one terminal.

In the microprocessor chip, the data center, and the computing system according to at least one example embodiment, optical signals that are processed in the microprocessor chip may be transmitted to the external device and the terminal without being changed into signals having a different form from the optical signals. Thus, a simple optical network may be configured, and thus, response speed, i.e., latency, and complexity may be improved compared to a wired network method. In addition, bandwidth may be improved compared to a wireless network method since the optical network may use a wide bandwidth. Thus, it is possible to form a cloud computing system using an ultra-slim laptop terminal without generating additional cost due to complexity.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
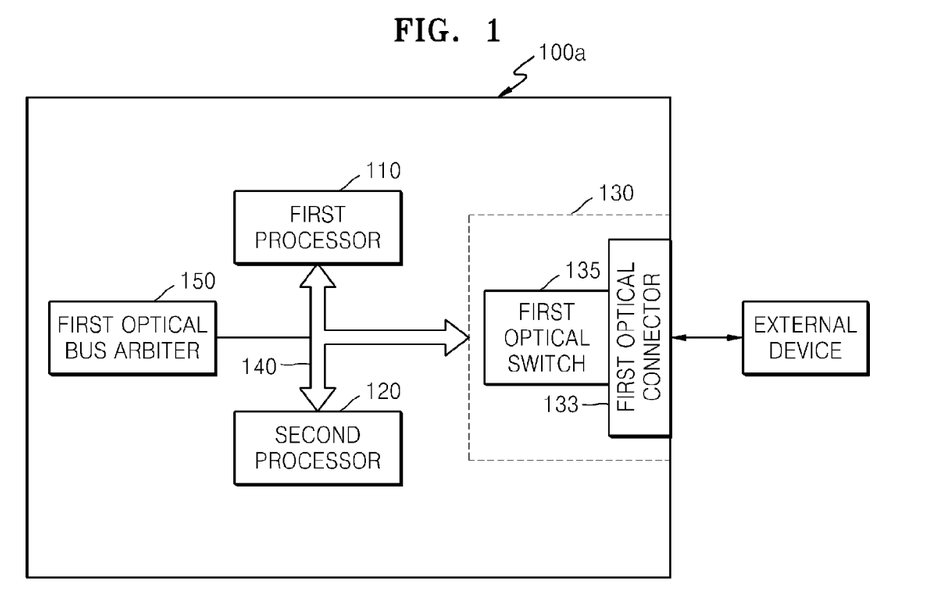
FIG. 1 is a block diagram schematically illustrating a microprocessor chip according to at least one example embodiment.

FIG. 1 is a block diagram schematically illustrating a microprocessor chip 100a according to at least one example embodiment.

Referring to FIG. 1, the microprocessor chip 100a may perform optical communication with an external device and include a first processor 110, a second processor 120, a first optical input/output unit 130, an optical system bus 140, and a first optical bus arbiter 150. Although not illustrated in FIG. 1, the microprocessor chip 100a may further include a register (not shown) for storing data.

Each of the first and second processors 110 and 120 that are a plurality of processors included in the microprocessor chip 100a may include, for example, a central processing unit (CPU), which includes a core and a cache memory, and a digital signal processor (DSP). The first and second processors 110 and 120 may receive optical signals to process data and output processed results as optical signals. Thus, each of the first and second processors 110 and 120 may include an optical detector (not shown) for receiving optical signals from an external device and an optical source (not shown) for transmitting optical signals to the external device. The optical detector and the optical source will be described in more detail with reference to FIG. 2.

The first optical input/output unit 130 is formed in the microprocessor chip 100a and may be configured to receive optical signals from the external device and transmit optical signals to the external device. Optical signals generated by the plurality of processors, that is, the first and second processors 110 and 120, may be directly transmitted to the external device through the optical system bus 140 and the first optical input/output unit 130. In addition, optical signals received from the external device by the first optical input/output unit 130 may be directly transmitted to the plurality of processors, that is, the first and second processors 110 and 120, through the optical system bus 140.

The first optical input/output unit 130 may include a first optical connector 133 and a first optical switch 135 to perform the above operation. The first optical connector 133 is an external terminal provided to physically connect the optical system bus 140 with the external device and may be exposed to the outside of the microprocessor chip 100a. Thus, the first optical input/output unit 130 may be configured to be connected with a second optical input/output unit (not shown) of the external device. In more detail, the first optical connector 133, which is a connecting component for connecting the optical system bus 140 and an optical fiber cable of the external device, may be located in the microprocessor chip 100a. The connecting component may include a plurality of connecting components, and, in this case, each of the plurality of connecting components may transmit optical signals based on a plurality of wavelengths to the external device. The first optical switch 135 is connected between the optical system bus 140 and the first optical connector 133 and may be configured to connect the optical system bus 140 and the first optical connector 133 in response to a control signal of the first optical bus arbiter 150.

The optical system bus 140 may be connected between the plurality of processors (that is, the first and second processors 110 and 120) and between the plurality of processors and the first optical input/output unit 130. The optical system bus 140 may transmit optical signals generated by the plurality of processors to the first optical input/output unit 130 or transmit optical signals received through the first optical input/output unit 130 from the external device to the plurality of processors. In addition, the optical system bus 140 may transmit optical signals generated by the first processor 110 to the second processor 120 or transmit optical signals generated by the second processor 120 to the first processor 110. That is, the optical system bus 140 may be an internal bus of the microprocessor chip, which is used to connect the plurality of processors and the register (not shown), for example, an internal bus depending on the advanced microcontroller bus architecture (AMBA) standard.

The optical system bus 140 may include optical wave guides (not shown) to transmit optical signals. Thus, through the optical wave guides of the optical system bus 140, optical signals received from the external device may be transmitted to the plurality of processors, or optical signals generated by the plurality of processors may be transmitted to the external device. The optical system bus 140 may be configured with a multichannel bus, and, in this case, the optical system bus 140 may include multichannel optical wave guides.

The first optical bus arbiter 150 may be configured to control transmission of optical signals on the optical system bus 140 by performing a bus arbitration function of the optical system bus 140. That is, when the plurality of processors try to use the same optical system bus 140 and thus bus contention occurs, the first optical bus arbiter 150 may determine the order of priority between the plurality of processors to allow them to use the optical system bus 140 in the order. The first optical bus arbiter 150 will be described in more detail with reference to FIG. 2.

Figure 2:
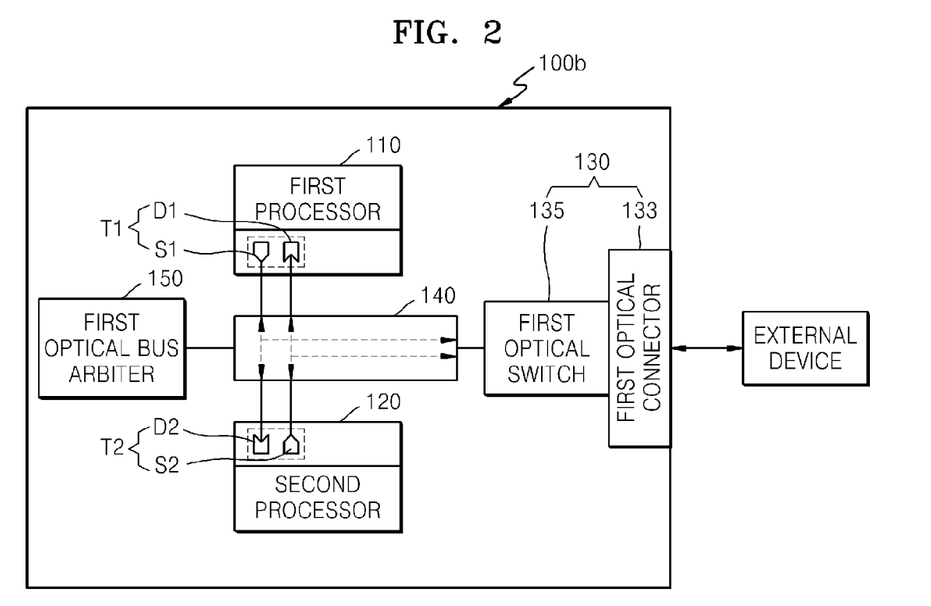
FIG. 2 is a block diagram schematically illustrating a microprocessor chip according to at least one example embodiment.

FIG. 2 is a block diagram schematically illustrating a microprocessor chip 100b according to at least one example embodiment. The microprocessor chip 100b may be a modified example configured by modifying some portions of the microprocessor 100a of FIG. 1. Thus, a repeated description thereof will be omitted.

Referring to FIG. 2, a first processor 110 may include a first optical transceiver T1, and a second processor 120 may include a second optical transceiver T2. An optical system bus 140 may be connected between the first and second optical transceivers T1 and T2 and a first optical input/output unit 130. Each of the first and second transceivers T1 and T2 may include an optical detector and an optical source. The optical detector may be configured to receive quantized optical signals to recognize data, and the optical source may be configured to generate logical data in a form of quantized optical signals. Although, in FIG. 2, each of the first and second transceivers T1 and T2 includes a single optical detector and a single optical source, each of the first and second transceivers T1 and T2 may include a plurality of optical detectors and a plurality of optical sources. In this case, the plurality of optical detectors may receive a plurality of optical signals having different wavelengths, and the plurality of optical sources may generate a plurality of optical signals having different wavelengths.

The first optical transceiver T1 of the first processor 110 may include a first optical detector D1 and a first optical source S1. The second optical transceiver T2 of the second processor 120 may include a second optical detector D2 and a second optical source S2. The first optical detector D1, the first optical source S1, the second optical detector D2, and the second optical source S2 may be embodied with in-chip modules embedded in the microprocessor chip 100b.

In order to perform data communication between the first processor 110 and the second processor 120, for example, if the first optical source S1 emits light according to a data bit value "1" (or "0"), the second optical detector D2 may receive optical signals through the optical system bus 140 and then determine that the data bit value output from the first optical source S1 is "1" (or "0"). Similarly, if the second optical source S2 emits light according to a data bit value "1" (or "0"), the first optical detector D1 may receive optical signals through the optical system bus 140 and then determine that the data bit value output from the second optical source S2 is "1" (or "0").

In order to perform data communication between the first processor 110 and the first optical input/output unit 130, for example, if the first optical source S1 emits light according to a data bit value "1" (or "0"), the first optical input/output unit 130 may receive optical signals through the optical system bus 140 and then transmit the optical signals to the external device, and thus, an optical detector (not shown) of the external device may detect that the data bit value output from the first optical source S1 is "1" (or "0"). In addition, if an optical source (not shown) of the external device emits light according to a data bit value "1" (or "0"), the first optical input/output unit 130 may receive optical signals and then transmit the received optical signals to the first optical detector D1 through the optical system bus 140, and thus, the first optical detector D1 may detect that the data bit value output from the external device is "1" (or "0"). The above operation may be similarly applied also to a case where the second processor 120 and the first optical input/output unit 130 perform data communication between them.

A first optical bus arbiter 150 is configured to control transmission of optical signals on the optical system bus 140. In more detail, the first optical bus arbiter 150 may be configured to determine the order of priority of operations between the first optical transceiver T1 and the second optical transceiver T2. If the first optical transceiver T1 and the second optical transceiver T2 try to use the optical system bus 140 at the same time and thus bus contention occurs, the first optical bus arbiter 150 may determine the order of priority between the first optical transceiver T1 and the second optical transceiver T2. Thus, the first optical transceiver T1 and the second optical transceiver T2 may perform a data input/output operation by using the optical system bus 140 in an order according to the order of priority.

For the above operation (that is, in order to determine the order of priority), the first optical bus arbiter 150 may be configured to control the first optical transceiver T1, the second optical transceiver T2, and a first optical switch 135 to determine a connection relation between the first and second optical transceivers T1 and T2 and a first optical connector 133. For example, when the order of priority has been determined so that the first transceiver T1 operates in a first priority and the second optical transceiver T2 operates in a second priority, the first optical bus arbiter 150 may first connect the first optical transceiver T1 and the optical system bus 140 and then control the first optical switch 135 to connect the optical system bus 140 with a connecting component of the first optical connector 133 wherein the connecting component corresponds to a wavelength that is used by the first optical transceiver T1. Then, the first optical bus arbiter 150 may connect the second optical transceiver T2 and the optical system bus 140 and then control the first optical switch 135 to connect the optical system bus 140 with a connecting component of the first optical connector 133 wherein the connecting component corresponds to a wavelength that is used by the second optical transceiver T2.

In addition, the first optical bus arbiter 150 may control the first optical transceiver T1, the second optical transceiver T2, and the first optical switch 135 so that parallel communication using a plurality of wavelengths is performed. For example, when at least one from among the first transceiver T1 and the second optical transceiver T2 uses a plurality of wavelengths, the first optical bus arbiter 150 may connect the first optical transceiver T1 and/or the second optical transceiver T2 with the optical system bus 140 and then control the first optical switch 135 to connect the optical system bus 140 with connecting components corresponding to the plurality of wavelengths, from among a plurality of connecting components of the first optical connector 133.

Figure 3:
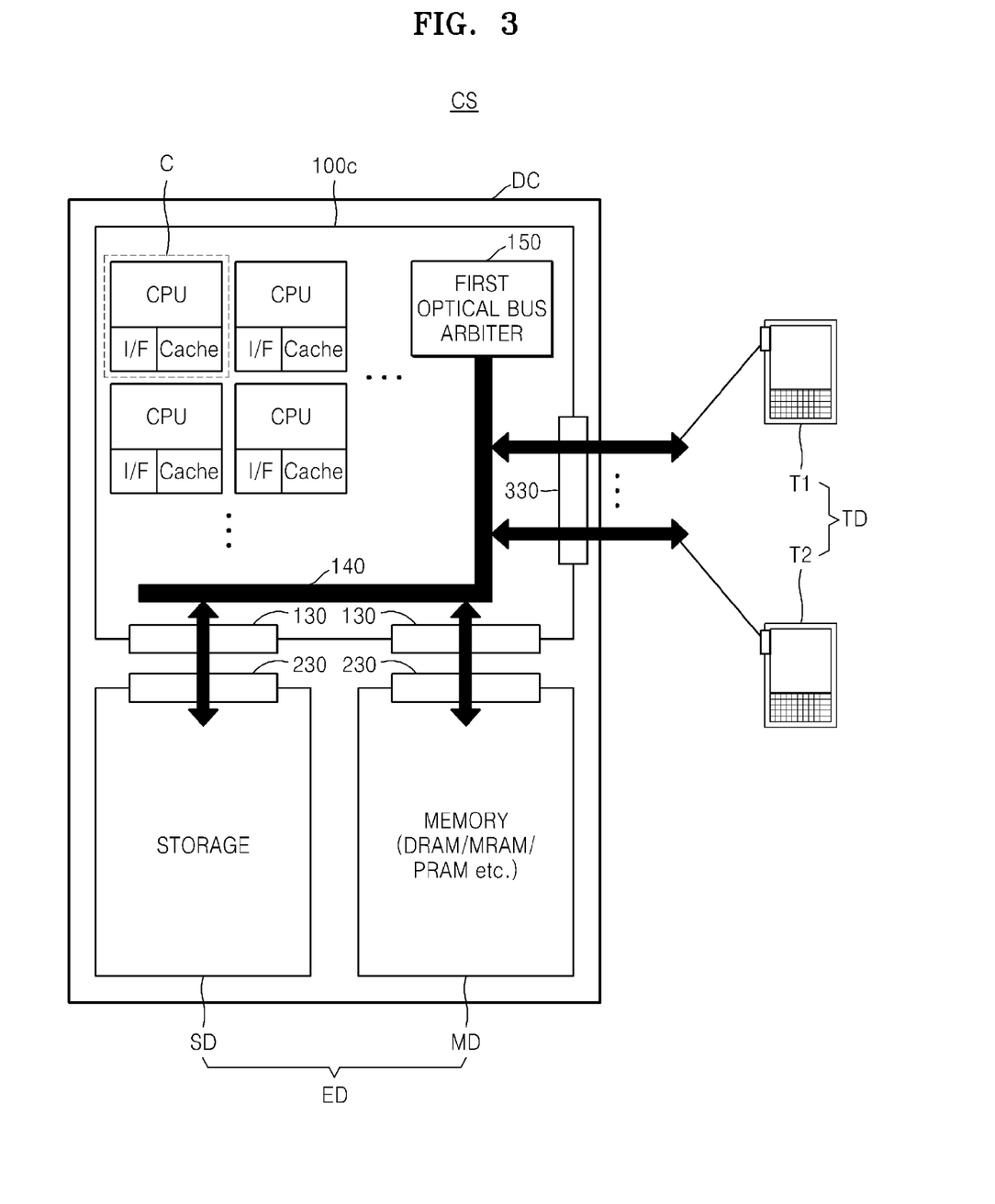
FIG. 3 is a block diagram schematically illustrating a data center and a computing system according to at least one example embodiment.

FIG. 3 is a block diagram schematically illustrating a data center DC and a computing system CS according to at least one example embodiment.

Referring to FIG. 3, the data center DC that is a host of a cloud computing system may include at least one microprocessor chip 100c, at least one external device ED, and at least one terminal TD.

The microprocessor chip 100c may perform data processing (for example, an arithmetic operation) with a first processing speed. The microprocessor chip 100c may include a first optical input/output unit 130 and an optical system bus 140. For example, the microprocessor chip 100c may be the microprocessor chip 100a or 100b of FIG. 1 and FIG. 2. Thus, a repeated description thereof will be omitted.

The microprocessor chip 100c may be a multi-core CPU chip, and, in this case, the microprocessor chip 100c may include a plurality of cores C, that is, a plurality of processors. Each of the plurality of cores C may include a CPU, an interface I/F (for example, an optical transceiver), and a cache memory.

The optical system bus 140 may be connected between the plurality of cores C and between the plurality of cores C and the first optical input/output unit 130. The optical system bus 140 may transmit optical signals generated by the plurality of cores C to the first optical input/output unit 130 or may transmit optical signals received through the first optical input/output unit 130 from the external device ED to the plurality of cores C.

The optical system bus 140 may include the optical system bus 140 described in FIGS. 1 and 2, and thus, a repeated description thereof will be omitted. Although not illustrated in FIG. 3, the optical system bus 140 may include an amplifier (not shown) for compensating reduction and/or distortion of optical signals. In addition, the optical system bus 140 may include a coupler that allows an optical signal moving through an optical wave guide to diverge into a plurality of paths and couples a plurality of optical signals moving through the optical wave guide into a single path.

The first optical input/output unit 130 is formed in the microprocessor chip 100c, and may be configured to receive optical signals from a second optical input/output unit 230 of the external device ED and transmit optical signals to the second optical input/output unit 230 of the external device ED. Optical signals generated by the plurality of cores C may be directly transmitted to the second optical input/output unit 230 of the external device ED through the optical system bus 140 and the first optical input/output unit 130. In addition, optical signals received from the second optical input/output unit 230 of the external device ED by the first optical input/output unit 130 may be directly transmitted to the plurality of cores C through the optical system bus 140.

The first optical input/output unit 130 and a first optical bus arbiter 150 may include the first optical input/output unit 130 and the first optical bus arbiter 150 described above with reference to FIGS. 1 and 2, and thus, a repeated description thereof will be omitted. The first optical switch 135 may include a wavelength division multi/demultiplexer (WDM) (not shown). The WDM may separate optical signals having different wavelengths, which move through the optical system bus 140, and then output the separated optical signals to respective predetermined paths (that is, an optical connector), and/or may be configured to perform a reverse operation of this operation. In this case, the first optical bus arbiter 150 may be configured to control the WDM to perform parallel communication using a plurality of wavelengths.

The external device ED is located in the data center DC and may perform data processing with a second processing speed that is slower than a first processing speed of the microprocessor chip 100c. The external device ED may include a memory device MD and a storage device SD.

The memory device MD is a space for temporarily storing data that is transmitted to the cores C and may include a volatile memory device and/or a nonvolatile memory device. The volatile memory device may include a dynamic random access memory (DRAM) and/or a static random access memory (SRAM), and the nonvolatile memory device may include a phase-change RAM (PRAM), a resistive RAM (RRAM), a nano floating gate memory (NFGM), a polymer RAM (PoRAM), a magnetic RAM (MRAM), a ferroelectric RAM (FeRAM), and/or a flash memory device.

The storage device SD for storing large capacity information may have a processing speed that is slower than that of the memory device MD. For example, the storage device SD may include magnetic media such as hard disks, floppy disks, and magnetic tapes, optical media such as CD-ROMs and DVDs, magneto-optical media such as floptical disks, and flash media such as USB storage devices and solid state drives.

The external device ED may include a second optical input/output unit 230. The second optical input/output unit 230 may be configured to receive optical signals from the first optical input/output unit 130 or transmit optical signals to the first optical input/output unit 130. The second optical input/output unit 230 is exposed to the outside of the external device ED and may include at least one second optical connector (not shown) configured to connect with the first optical input/output unit 130 of the microprocessor chip 100c. Thus, optical signals processed in the microprocessor chip 100c may be transmitted to the external device ED through the second optical connector without changing the optical signals into signals having a different form.

The configurations stated above relate to the data center DC that is a host of a data cloud computing system, and a whole data cloud computing system may include the data center DC and the terminal TD. In order to perform data communication with the terminal TD, the microprocessor chip 100c may further include a third optical input/output unit 330.

The third optical input/output unit 330 is formed in the microprocessor chip 100c, and may be configured to receive optical signals from the terminal TD and transmit optical signals to the terminal TD. The third optical input/output unit 330 is different from the first optical input/output unit 130 of FIGS. 1 and 2 in that the third optical input/output unit 330 is connected with the terminal TD, but may perform the same function as the first optical input/output unit 130 of FIGS. 1 and 2. Thus, optical signals generated by the cores C, i.e., the processors, may be directly transmitted to the terminal TD through the optical system bus 140 and the third optical input/output unit 330, and optical signals received from the terminal TD by the third optical input/output unit 330 may be directly transmitted to the cores C through the optical system bus 140.

In more detail, the third optical input/output unit 330 is exposed to the outside of the microprocessor chip 100c and may include at least one third optical connector (not shown) configured to connect with an optical input/output unit (not shown) of the terminal TD. Thus, optical signals processed in the microprocessor chip 100c may be transmitted to the terminal TD through the third optical connector without changing the optical signals into signals having a different form.

In the case of a cloud computing system, the data center DC that is a host of each separate terminal TD has to process a large quantity of information that is received from the separate terminal TD and to perform many arithmetical operations. When processing the information and performing the operations by using a wired network, latency and complexity is increased due to an increase in connections between networks. When establishing a cloud computing system by using a wireless network, connections between networks may be decreased, but the terminal TD has to perform many arithmetical operations and to include a large storage space due to a limited bandwidth of the wireless network.

However, in the data center DC and the computing system according to at least one example embodiment, optical signals that are processed in the microprocessor chip 100c may be transmitted to the external device ED and the terminal TD without having to be changed into signals having a different form from the optical signals. Thus, a simple optical network may be implemented, and thus, latency and complexity may be improved compared to the wired network method. In addition, the bandwidth may be improved compared to the wireless network method since the optical network may use a wide bandwidth. Thus, it is possible to form a cloud computing system using an ultra-slim laptop terminal without generating additional cost due to the complexity.

Figure 4:
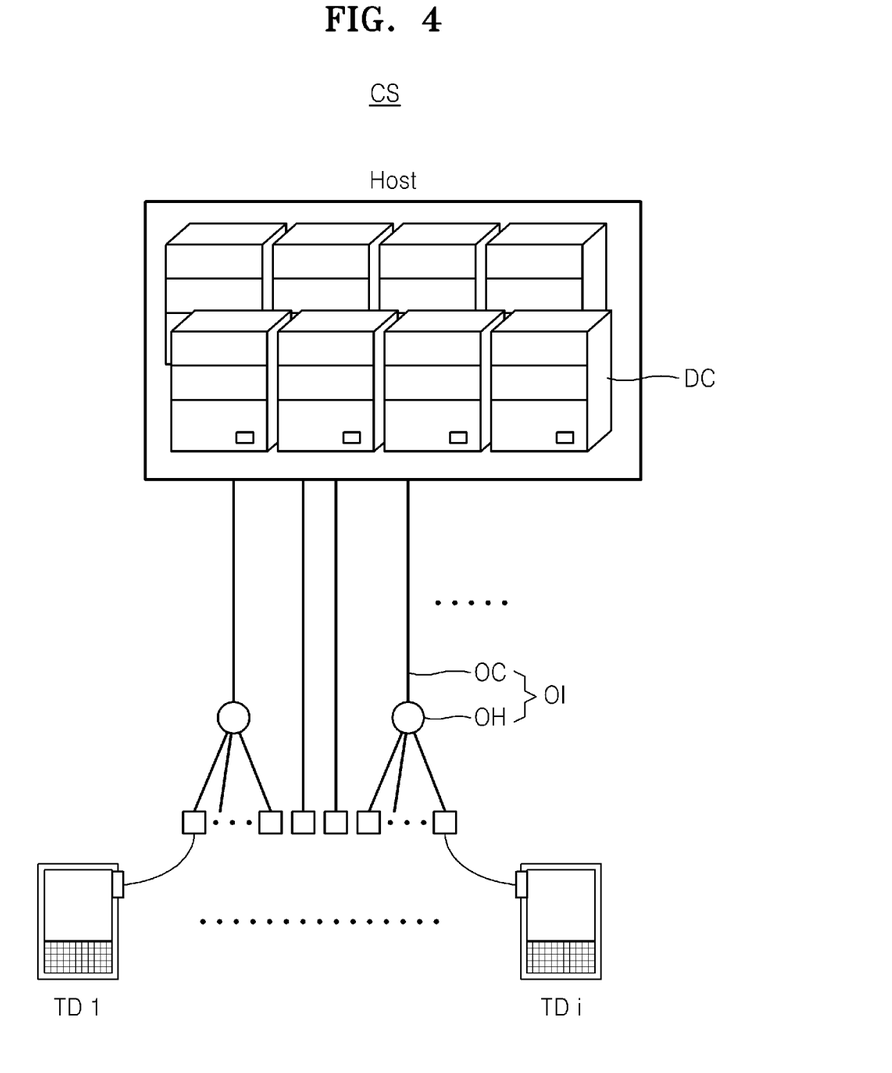
FIG. 4 is a block diagram schematically illustrating a computing system according to at least one example embodiment.

FIG. 4 is a block diagram schematically illustrating a computing system CS according to at least one example embodiment.

Referring to FIG. 4, a host of the computing system CS may include a plurality of data centers DC. The plurality of data centers DC may be connected to each other to perform distributed computing. The data centers DC may be, for example, the data center DC of FIG. 3 and may include the microprocessor chip 100a of FIG. 1 or the microprocessor chip 100b of FIG. 2. The computing system CS may include a plurality of terminals TD1-TDi, where i is a positive integer.

Each of a plurality of terminals TD1-TDi in the computing system CS may include an ultra-thin laptop that is configured to perform only functions for interfacing with a user. The ultra-thin laptop may include a display device and an input device.

The host and the plurality of terminals TD1-TDi may be connected to each other through an optical interconnection (OI) including an optical hub (OH) and an optical cable (OC). In more detail, optical signals that are output from the host, as described above with reference to FIG. 3, may be signals output through the third optical input/output unit (for example, 330 of FIG. 3) of the microprocessor chip (for example, 100c of FIG. 3) in the data center DC of the host. Thus, optical signals that are processed in the microprocessor chip of the data center DC may be directly transmitted to the terminals TD1-TDi without having to be changed into signals having a different form from the optical signals.

A cloud computing system may be configured using an optical network in which a wide bandwidth may be embodied, and thus, functions such as an operating system (OS) for driving the terminals and application programs may be collectively managed in the data center DC of the host. As a result, the computing system according at least one example embodiment may easily manage data in, for example, a government office, a company office, a school, or a research institute and may have a profitable technical effect in terms of security.

Furthermore, in the computing system according to at least one example embodiment, the functions of the terminals may be minimized due to an increase in bandwidth. In addition, external devices such as a memory device or a storage device may be formed in the host, and thus, an overlapping or unnecessary storage space may be removed to save storage space. According to results of a simulation, in the computing system according to at least one example embodiment, the capacity of a memory device is reduced to less than a quarter of that of a conventional computing system, and the capacity of a storage device is reduced to less than one-tenth of that of the conventional computing system.

Figure 5:
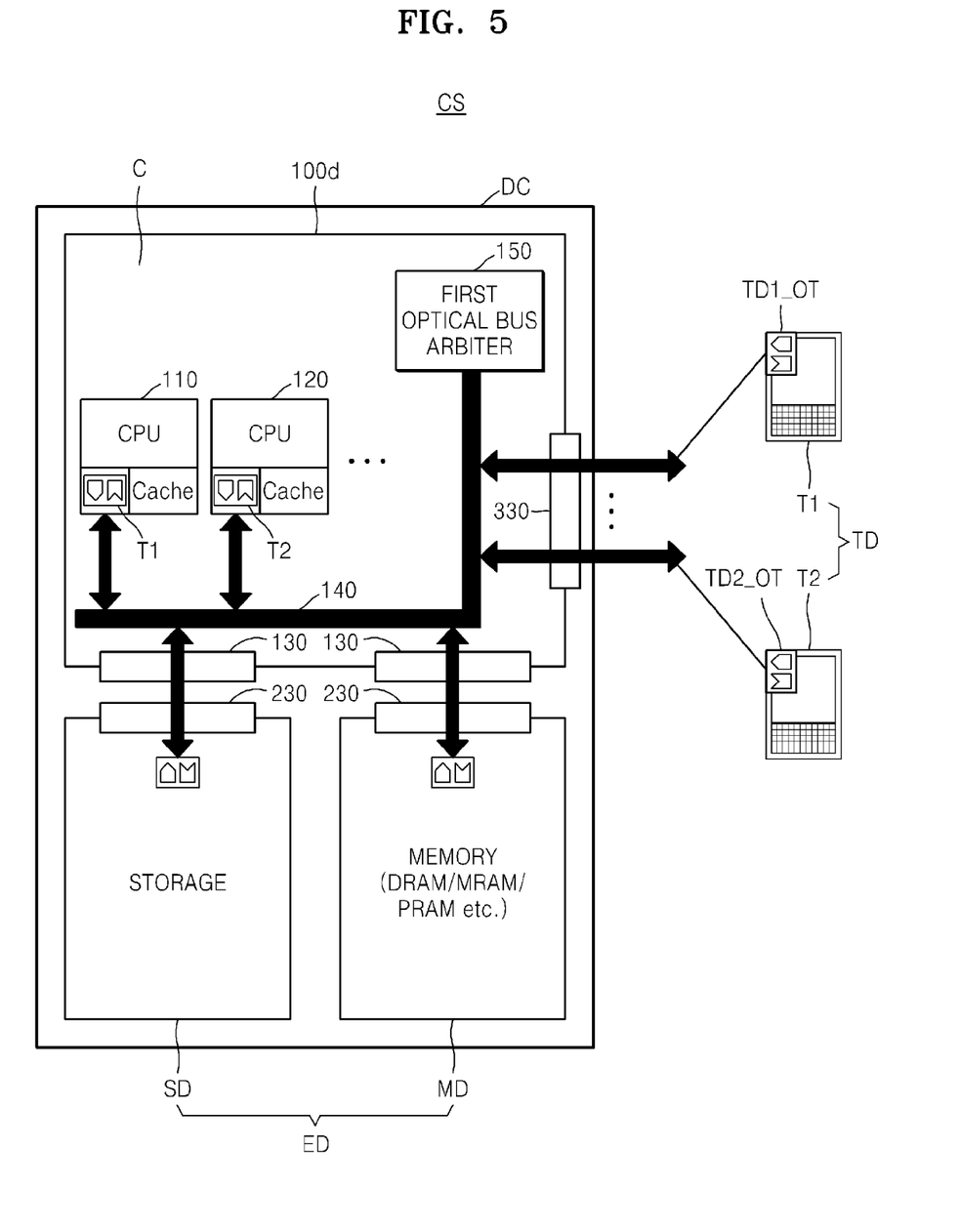
FIG. 5 is a block diagram schematically illustrating a data center and a computing system according to at least one example embodiment.

FIG. 5 is a block diagram schematically illustrating a data center DC and a computing system CS according to at least one example embodiment. The data center DC and the computing system CS of FIG. 5 may be modified examples of the data center DC and the computing system CS of FIG. 3. Thus, a repeated description thereof will be omitted.

Referring to FIG. 5, the microprocessor chip 100d that is a multi-core CPU chip may include a first processor 110, which is a first core, and a second processor 120, which is a second core. A first terminal TD1 of a plurality of terminals TD may be controlled by the first processor 110, and a second terminal TD2 of the plurality of terminal TD may be controlled by the second processor 120. A simultaneous multi-tasking function may be realized by the above stated connection relation.

The first processor 110 may be used to process authentication regarding a user of the first terminal TD1, operation system loading thereof, and application program execution thereof. If a first user of the first terminal TD1 inputs first user information (for example, the terminal's own number, ID and password, and/or vital information such as a fingerprint), an optical transceiver TD1_OT of the first terminal TD1 generates an optical signal corresponding to the first user information, and the optical signal is transmitted to a first optical transceiver T1 of the first processor 110 through a third optical input/output unit 330 and an optical system bus 140. The first processor 110 performs an authentication operation by loading the first user information from a storage device SD and/or a memory device MD through a second optical input/output unit 230, a first optical input/output unit 130, and the optical system bus 140.

Simultaneously, the second processor 120 may be used to process authentication regarding a user of the second terminal TD2, operation system loading thereof, and application program execution thereof. If a second user of the second terminal TD2 inputs a second user information, an optical transceiver TD2_OT of the second terminal TD2 generates an optical signal corresponding to the second user information, and the optical signal is transmitted to a second optical transceiver T2 of the second processor 120 through the third optical input/output unit 330 and the optical system bus 140. The second processor 120 performs an authentication operation by loading the second user information from the storage device SD and/or the memory device MD through the second optical input/output unit 230, the first optical input/output unit 130, and the optical system bus 140.

In order to simultaneously perform the OS loading operations and the application program execution operations of the first and second terminals TD 1 and TD2 as well as the authentication operations, it is necessary to frequently access the first optical input/output unit 130, the second optical input/output unit 230, and the third optical input/output unit 330, and a high response speed, i.e, low latency, of the optical system bus 140 and a wide bandwidth is also required.

In the data center and the computing system according to the embodiments of at least one example embodiment, optical signals generated by the first processor 110 and the second processor 120 of the microprocessor chip 100d may be directly transmitted to the external device ED, the first terminal TD1, and the second terminal TD2. This configuration is distinguished from general configurations in each of which processors of a microprocessor chip have to change optical signals into electrical signals at least one time when transmitting the optical signals to a plurality of terminals (or, processors of a microprocessor chip directly transmit electrical signals changed from optical signals to the plurality of terminals). Due to this distinction, in the data center and the computing system according to the embodiments of at least one example embodiment, a high response speed, i.e, low latency, and a wide bandwidth may be maintained, and thus, a simultaneous multi-tasking function may be realized.

Furthermore, in the data center DC and the computing system according to the embodiments of at least one example embodiment, optical signals that are processed in the microprocessor chip 100d may be transmitted to the external device ED and the first and second terminals TD1 and TD2 without having to be changed into signals having a different form from the optical signals. Thus, it is not necessary to add a module such as a serializer/deserializer (SERDES) or a low voltage differential signaling (LVDS) receiver in an input/output unit.

Figure 6:
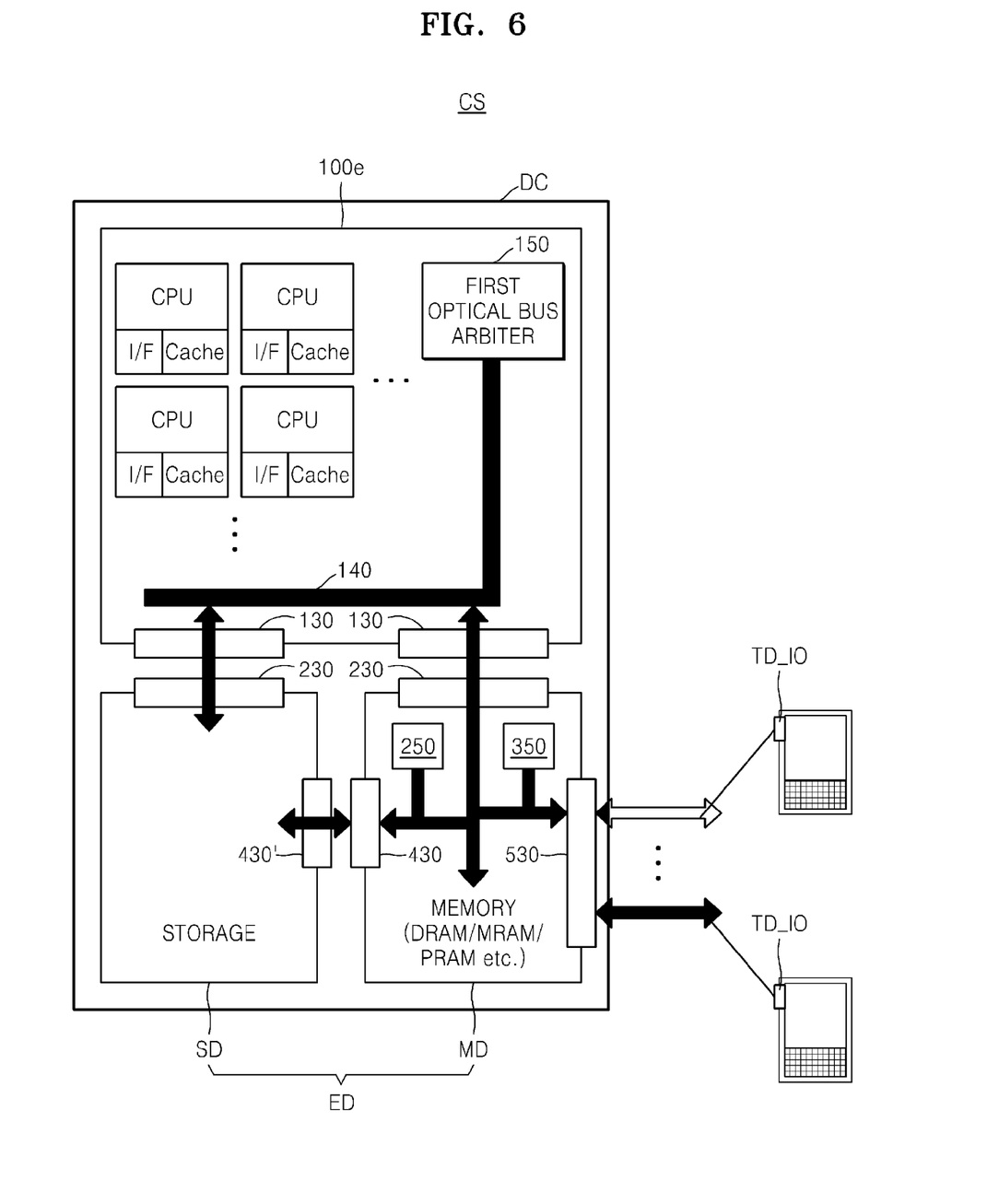
FIG. 6 is a block diagram schematically illustrating a data center and a computing system according to at least one example embodiment.

FIG. 6 is a block diagram schematically illustrating a data center DC and a computing system CS according to at least one example embodiment. The data center DC and the computing system CS of FIG. 6 may be modified examples of the data center DC and the computing system CS of FIG. 3. Thus, a repeated description thereof will be omitted.

Referring to FIG. 6, an external device ED may include at least one fourth optical input/output unit 430 configured to receive optical signals from another external device or transmit optical signals to another external device. For example, a memory device MD may include the fourth optical input/output unit 430 configured to receive optical signals from a storage device SD or transmit optical signals to the storage device SD. The fourth input/output unit 430 may be exposed to the outside of the memory device MD and may include at least one fourth optical connector (not shown) configured to connect with an optical input/output unit 430' of the storage device SD.

In addition, the external device ED may include at least one fifth optical input/output unit 530 configured to receive optical signals from the terminal TD or transmit optical signals to the terminal TD. For example, the memory device MD may include the fifth optical input/output unit 530 provided for data communication with the terminal TD. The fifth optical input/output unit 530 may be exposed to the outside of the memory device MD and may include at least one fifth optical connector (not shown) configured to connect with an optical input/output unit TD_IO of the terminal TD. The embodiment of FIG. 6 is distinguished from the embodiments of FIGS. 3 and 5 in which the data center DC and the terminal TD are connected to each other through the third optical input/output unit 330 formed in the microprocessor chip.

A shared memory scheme may be realized by the fourth optical input/output unit 430 and the fifth optical input/output unit 530. Data communication may be performed between the memory device MD and the terminal TD and between the memory device MD and the storage device SD due to the shared memory scheme.

In FIG. 5, the terminal TD performs data communication through direct optical connection with the microprocessor chip 100d, and an operation of the memory device is indispensable for data communication. Thus, frequent access to a first optical input/output unit 130 of FIG. 5, a second optical input/output unit 230 of FIG. 5, and a third optical input/output unit 330 of FIG. 5 is required in order for an operation of the terminal TD to be performed. However, in the computing system CS of FIG. 6 according to the current embodiment of at least one example embodiment, since the shared memory scheme is realized, data transmitted from the terminal TD may be directly stored in the memory device MD without passing through the microprocessor chip 100e. Thus, frequency of bus contention occurring due to use of the optical system bus 140 of the microprocessor chip 100e may be decreased, and, consequently, the performance of the computing system CS may be improved.

A second optical bus arbiter 250 may control optical transmission between the external device ED and the microprocessor chip 100e and optical communication between the external device ED and another external device. For example, the second optical bus arbiter 250 may control optical transmission between the memory device MD and the microprocessor chip 100e and optical transmission between the memory device MD and the storage device SD. Data shadowing between the memory device MD and the storage device SD may be realized through arbitration performed by the second optical bus arbiter 250, and, consequently, the performance of the computing system may be improved.

A third optical bus arbiter 350 may control optical transmission between the external device ED and the microprocessor chip 100e and optical communication between the external device ED and the terminal TD. For example, the third optical bus arbiter 350 may control optical transmission between the memory device MD and the microprocessor chip 100e and optical transmission between the memory device MD and the terminal TD. The second optical bus arbiter 250 and the third optical bus arbiter 350 may be formed with a single bus arbiter in the memory device MD.

Figure 7:
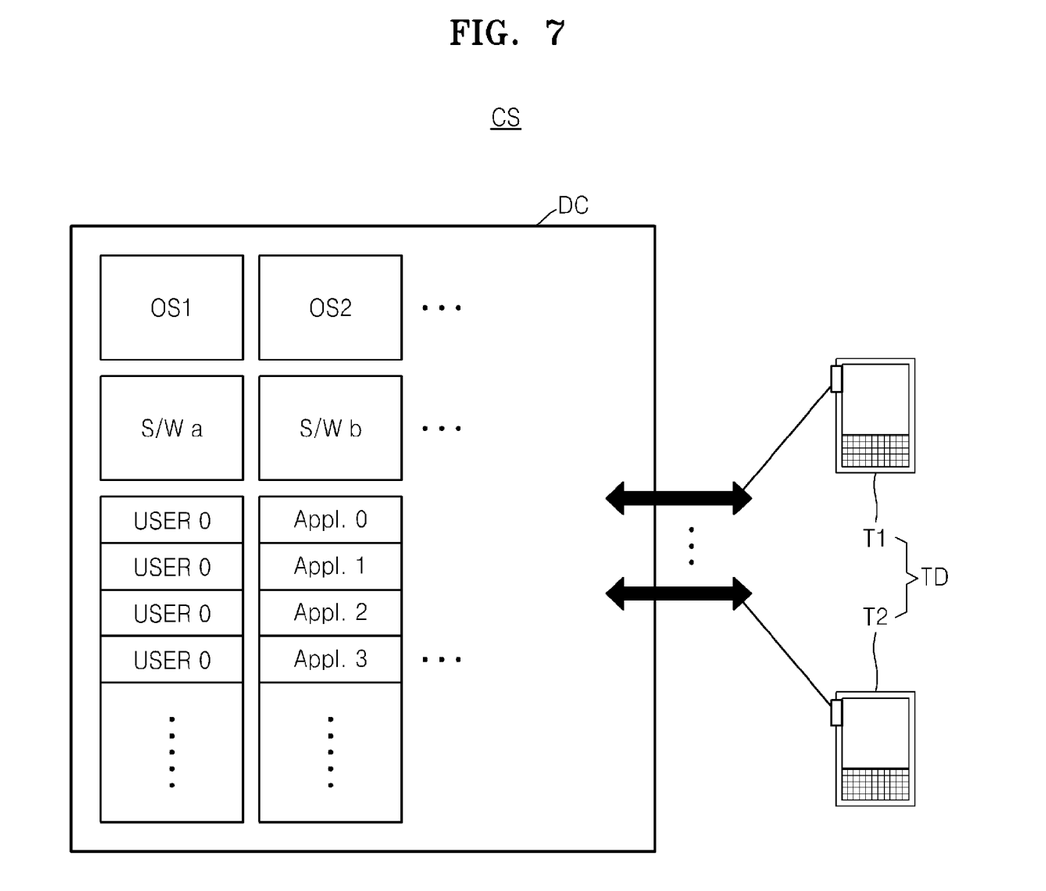
FIG. 7 is a block diagram schematically illustrating a data center and a computing system according to at least one example embodiment.

FIG. 7 is a block diagram schematically illustrating a data center DC and a computing system CS according to at least one example embodiment. The data center DC and the computing system CS of FIG. 7 may be modified examples of the data center DC and the computing system CS of FIG. 5. Thus, a repeated description thereof will be omitted.

Referring to FIG. 7, terminals TD may not store operating systems OS1 and OS2 for operations of the terminals TD therein. The operating systems OS1 and OS2 for operations of the terminals TD may be stored in the data center DC. As described above with referenced to FIG. 5, if authentication operations between the data center DC and the terminals TD are completed by using authentication information USER0 through USER3 stored in the data center DC, the data center DC may transmit the operating systems OS1 and OS2 based on authenticated user information to the terminals TD, and thus, a booting operation of the terminals TD may be performed. The data center DC and the computing system CS according at least one example embodiment has improved effect in terms of security since data of an individual user (that is, user information, operating systems, software, application programs, and the like) are collectively managed in the data center DC.

It should be understood that shapes of each parts in the attached drawings are provided to help clearly understand the example embodiments and are merely illustrative. It should be noted that the shown shapes may be modified to form various shapes. Like reference numerals in the drawings denote like elements.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A microprocessor chip for performing optical communication with at least one external device, the microprocessor chip comprising:
   a first processor including a first optical transceiver;
   a second processor including a second optical transceiver;
   at least one first optical input/output unit that is formed in the microprocessor chip and is configured to receive optical signals from the at least one external device and transmit optical signals to the at least one external device;
   an optical system bus that is connected between the first and second transceivers and the at least one first optical input/output unit; and
   a first optical bus arbiter that is configured to control transmission of an optical signal on the optical system bus,
   wherein the at least one first optical input/output unit includes,
      at least one first optical connector that is exposed to an area outside of the microprocessor chip and is configured to connect with a second optical input/output unit of the at least one external device; and
      at least one first optical switch that is connected between the at least one first optical connector and the optical system bus, wherein the first optical bus arbiter is configured to control the first optical transceiver, the second optical transceiver, and the at least one first optical switch to determine connection relation between the first and second transceivers and the at least one first optical connector.

2. A microprocessor chip for performing optical communication with at least one external device, the microprocessor chip comprising:
a first processor including a first optical transceiver;
a second processor including a second optical transceiver;
at least one first optical input/output unit that is formed in the microprocessor chip and is configured to receive optical signals from the at least one external device and transmit optical signals to the at least one external device;
an optical system bus that is connected between the first and second transceivers and the at least one first optical input/output unit; and
a first optical bus arbiter that is configured to control transmission of an optical signal on the optical system bus,
wherein the at least one first optical input/output unit includes,
at least one first optical connector that is exposed to an area outside of the microprocessor chip and is configured to connect with a second optical input/output unit of the at least one external device; and
at least one first optical switch that is connected between the at least one first optical connector and the optical system bus,
wherein, the first optical bus arbiter is configured to control the first optical transceiver, the second optical transceiver, and the at least one first optical switch so that parallel communication using a plurality of wavelengths is performed when at least one from among the first optical transceiver and the second optical transceiver uses the plurality of wavelengths.

3. A data center comprising:
a microprocessor chip having a first processing speed; and
at least one first external device having a second processing speed that is slower than the first processing speed,
wherein the microprocessor chip includes,
a plurality of processors;
at least one first optical input/output unit that is formed in the microprocessor chip and is configured to receive optical signals from the at least one external device and transmit optical signals to the at least one external device; and
an optical system bus that is connected between the plurality of processors and the at least one first optical input/output unit,
wherein the at least one first external device includes,
at least one second optical input/output unit that is configured to receive optical signals from a second external device or transmit optical signals to the second external device; and
a first optical bus arbiter that is configured to control transmission of optical signals between the at least one first external device and the microprocessor chip and transmission of optical signals between the at least one first external device and the second external device, wherein the at least one second optical input/output unit includes at least one first optical connector that is exposed to an area outside of the at least one first external device and is configured to connect with an optical input/output unit of the second external device.

4. The data center of claim 3, wherein the at least one first external device includes at least one from among a memory device and a storage device.

5. The data center of claim 3, wherein optical signals that are processed in the microprocessor chip are transmitted to the at least one first external device without being changed into signals having a different form from the optical signals.

6. The data center of claim 3, wherein the at least one first external device includes at least one second optical input/output unit that is configured to receive optical signals from the at least one first optical input/output unit or transmit optical signals to the at least one first optical input/output unit.

7. The data center of claim 6, wherein the at least one second optical input/output unit includes at least one first optical connector that is exposed to an area outside of the at least one first external device and is configured to connect with the at least one first optical input/output unit of the microprocessor chip.

8. A computing system comprising:
a data center; and
at least one terminal that is configured to operate through optical communication with the data center,
wherein the data center includes,
a microprocessor chip having a first processing speed; and
at least one first external device having a second processing speed that is slower than the first processing speed,
wherein the microprocessor chip includes,
a plurality of processors;
at least one first optical input/output unit that is formed in the microprocessor chip and is configured to receive optical signals from the at least one external device and transmit optical signals to the at least one external device; and
an optical system bus that is connected between the plurality of processors and the at least one first optical input/output unit, wherein the microprocessor chip of the data center is configured such that optical signals that are processed in the microprocessor chip of the data center are transmitted to the at least one terminal without being changed into signals having a different form from the optical signals, wherein the at least one terminal includes,
a first terminal and a second terminal, the first terminal is controlled by
a first processor of the microprocessor chip, and the second terminal is controlled by a second processor of the microprocessor chip.

9. The computing system of claim 8, wherein the microprocessor chip further comprises:
at least one second optical input/output unit that is configured to receive optical signals from the at least one terminal or transmit optical signals to the at least one terminal.

10. The computing system of claim 9, wherein the at least one second optical input/output unit includes at least one optical connector that is exposed to an area outside of the microprocessor chip and is configured to connect with an optical input/output unit of the at least one terminal.

11. The computing system of claim 8, wherein the microprocessor chip of the data center is configured such that the optical signals that are processed in the microprocessor chip of the data center are transmitted to the at least one terminal through the at least one first external device without being changed into signals having a different form from the optical signals.

12. The computing system of claim 11, wherein the at least one external device comprises:

at least one second optical input/output unit that is configured to receive optical signals from the at least one terminal or transmit optical signals to the at least one terminal.

13. The computing system of claim 12, wherein the at least one second optical input/output unit includes at least one first optical connector that is exposed to an area outside of the at least one first external device and is configured to connect with an optical input/output unit of the at least one terminal.

14. The computing system of claim 13, wherein the at least one first external device further comprises:
   a first optical bus arbiter that is configured to control transmission of optical signals between the at least one first external device and the microprocessor chip and transmission of optical signals between the at least one first external device and the at least one terminal.

* * * * *